No. 741,783. PATENTED OCT. 20, 1903.
H. R. FOX.
HORSESHOE CALK.
APPLICATION FILED MAY 29, 1903.
NO MODEL.
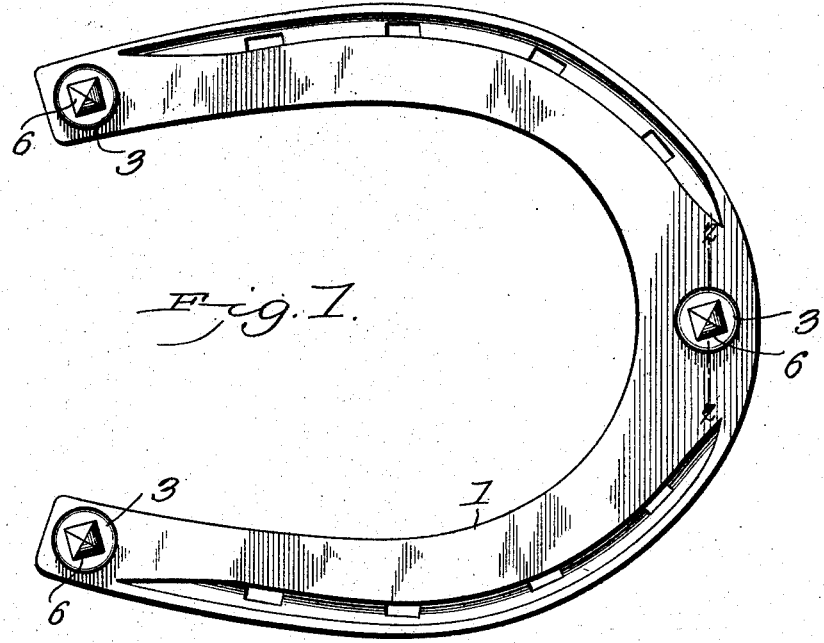
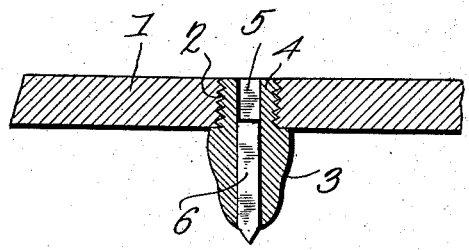
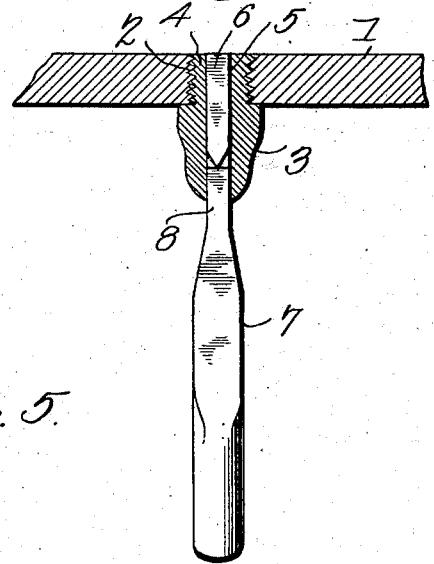
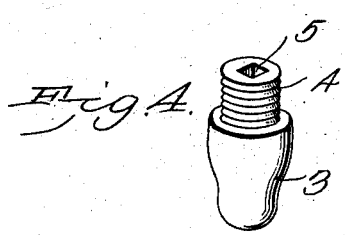
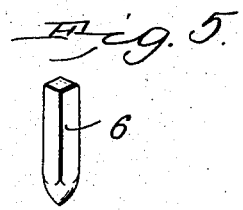
Witnesses H. R. Fox, Inventor.

No. 741,783. Patented October 20, 1903.

UNITED STATES PATENT OFFICE.

HARVEY RICHARD FOX, OF CUT BANK, MONTANA.

HORSESHOE-CALK.

SPECIFICATION forming part of Letters Patent No. 741,783, dated October 20, 1903.

Application filed May 29, 1903. Serial No. 159,347. (No model.)

*To all whom it may concern:*

Be it known that I, HARVEY RICHARD FOX, a citizen of the United States, residing at Cut Bank, in the county of Teton and State of Montana, have invented a new and useful Improvement in Horseshoe-Calks, of which the following is a specification.

My invention relates to horseshoe-calks, and has for its object to produce a device of this character which will be simple of construction, efficient in operation, and one in which the calk may when it becomes impaired by wear be readily removed from the shoe and replaced by a new calk without removing the shoe from the animal's hoof.

To these ends the invention comprises the novel details of construction and combination of parts more fully hereinafter described.

In the accompanying drawings, Figure 1 is a bottom plan view of a horseshoe having my improved calk applied thereto. Fig. 2 is a central vertical section through the calk on the line 2 2 of Fig. 1, showing the normal position of the parts. Fig. 3 is a similar view showing the instrument in position for removing the calk. Fig. 4 is a detail perspective view of the calk. Fig. 5 is a similar view of the wearing member.

Referring to the drawings, 1 indicates a horseshoe, which may be of the usual or any desired construction and material, provided with circular screw-threaded apertures 2 at its toe and heels for the reception of my improved calk 3, which has a reduced screw-threaded neck 4, tapped into the screw-threaded orifices 2, and a depending substantially conical body portion.

5 is a central longitudinal opening which extends entirely through the calk and is preferably square in cross-section, but may be of other angular or polygonal form. This opening 5 receives a wearing member 6, which is of coincident form in cross-section and which in practice has its lower end projected slightly below the end of the body portion of the calk and sharpened for engagement with the ground. The wearing member is in length equal to about one-half the length of the opening 5 for the purpose which will presently appear. The wearing member 6 is composed, preferably, of chilled steel and is of slightly greater diameter than the diameter of opening 5 through the body portion, which latter is preferably composed of malleable or wrought iron. Thus in assembling the parts the member 6 is dropped into the opening 5 and driven therethrough and being of a harder material than the material of the calk bites into the latter and is thus securely held by friction to its active position, as will be readily understood. In practice after the member 6 and body portion of the calk have become worn to an extent sufficient to render them defective the calk may be readily removed from the shoe and replaced by a new one without removing the shoe from the animal's hoof by the employment of a tool or instrument such as is indicated at 7, which has a reduced portion 8 of a form in cross-section to coincide with the opening 5. The tool 7 is placed against the outer end of member 6 and struck several sharp blows with a hammer, which drives the member 6 upward in the opening 5 and permits the introduction of the reduced portion 8 of the tool into the outer end of the opening, as represented in Fig. 3. Thus it will be seen that the tool may be readily manipulated for removing the calk and that a new calk may then be inserted without removing the shoe, as before stated.

From the foregoing it will be seen that I produce a device of simple construction which will be efficient in operation and one in which the calk may be readily applied to or removed from the shoe, as above explained. In attaining these ends I do not limit myself to the precise details herein shown and described, inasmuch as minor changes in the form, proportion, and manner of assemblage of the parts may be made without departing from the spirit of my invention.

Having thus described my invention, what I claim is—

The combination with a shoe, of a calk in threaded engagement therewith and having a longitudinal opening of non-circular form in cross-section, a wearing member of similar cross-sectional form disposed in the opening at its outer end, said member being of lesser length than the length of the opening, whereby when worn it can be driven inward without removing the shoe from the hoof, thus permitting a tool to engage the socket for unscrewing the calk.

In testimony that I claim the foregoing as my own I have hereto affixed my signature in the presence of two witnesses.

HARVEY RICHARD FOX.

Witnesses:
ABRAHAM L. MILLER,
FELTON HERMANSFELDT.